United States Patent
Goto (10) Patent No.: US 8,253,056 B2
(45) Date of Patent: Aug. 28, 2012

(54) RESISTANCE WELDING METHOD AND RESISTANCE WELDING APPARATUS

(75) Inventor: Akira Goto, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 12/749,771

(22) Filed: Mar. 30, 2010

(65) Prior Publication Data

US 2010/0243616 A1    Sep. 30, 2010

(30) Foreign Application Priority Data

Mar. 31, 2009  (JP) ................... 2009-087946
Mar. 17, 2010  (JP) ................... 2010-061024

(51) Int. Cl.
*B23K 11/00*    (2006.01)

(52) U.S. Cl. ............... 219/78.01; 219/86.1; 219/86.22; 219/86.25; 219/117.1; 219/119; 219/780

(58) Field of Classification Search ............... 219/117.1, 219/119, 780, 78.01, 86.1, 86.22, 86.25
See application file for complete search history.

(56) References Cited

U.S. PATENT DOCUMENTS

2009/0302010 A1*  12/2009  Goto et al. ............... 219/117.1

FOREIGN PATENT DOCUMENTS

| JP | 59-193773 | 11/1984 |
| JP | 63-183781 | 7/1988 |
| JP | 2005-262259 | 9/2005 |
| JP | 2008-246538 | 10/2008 |

* cited by examiner

*Primary Examiner* — Long Tran
(74) *Attorney, Agent, or Firm* — Rankin, Hill & Clark LLP (57) ABSTRACT

A resistance welding apparatus includes a welding gun having a first electrode tip serving as a first welding electrode, a second electrode tip serving as a second welding electrode, and a current branching electrode. The current branching electrode has an annular shape and is disposed in surrounding relation to the first electrode tip. The first electrode tip and the current branching electrode abut against a thinnest workpiece disposed on an outermost side of a stacked assembly that is resistance-welded by the resistance welding apparatus, and have opposite polarities to each other. When an electric current is passed from the first electrode tip to the second electrode tip and through the stacked assembly, a branched electric current flows from the first electrode tip to the current branching electrode.

9 Claims, 8 Drawing Sheets

RESISTANCE WELDING METHOD AND RESISTANCE WELDING APPARATUS

CROSS-REFERENCE TO RELATED APPLICATION

This application is based upon and claims the benefit of priority from Japanese Patent Applications No. 2009-087946 filed on Mar. 31, 2009 and No. 2010-061024 filed on Mar. 17, 2010, of which the contents are incorporated herein by reference.

BACKGROUND OF THE INVENTION

1. Field of the Invention

The present invention relates to a resistance welding method and a resistance welding apparatus for resistance-welding a stacked assembly made up of three or more workpieces, including a thinnest workpiece which is disposed on an outermost side of the stacked assembly.

2. Description of the Related Art

One known process for joining a plurality of metal sheets to each other is a resistance welding process, in which the metal sheets are stacked in a stacked assembly. Then, after the stacked assembly has been gripped and pressed by a set of welding electrodes, an electric current is passed between the welding electrodes in order to melt a region of the metal sheets near contact surfaces thereof. When solidified, the melted region is turned into a solid phase called a nugget. In some cases, three or more metal sheets are joined together by such a resistance welding process.

The thicknesses of metal sheets or workpieces to be resistance-welded are not necessarily identical to each other, and in most cases are different from each other. Therefore, the metal sheets tend to include a workpiece having a smallest thickness (hereinafter also referred to as a "thinnest workpiece").

If the stacked assembly of metal sheets is resistance welded with the thinnest workpiece disposed on an outermost side of the stacked assembly, then the nugget, which is formed between the thinnest workpiece and a workpiece adjacent thereto, may not grow sufficiently. The reason for insufficient growth of the nugget is considered to be based on the fact that since the thickness of the thinnest workpiece is the smallest and its specific resistance is minimum, the thinnest workpiece fails to generate a sufficient amount of Joule heat.

In order to cause the nugget near the thinnest workpiece to grow sufficiently, Joule heat generated in the thinnest workpiece may be increased by increasing the electric current that is passed between the welding electrodes. However, in this case, large electric current tends to flow through a workpiece of a larger thickness, and thus, such an increased electric current tends to unduly melt the workpiece, thus producing scattering of metal particles and resulting in sputtering.

Alternatively, a period of time during which electric current is applied may be increased. However, in this case also, it is difficult to generate sufficient Joule heat in the thinnest workpiece. Additionally, a longer welding time results in a lower welding efficiency, disadvantageously.

In view of the above difficulties, Japanese Laid-Open Patent Publication No. 2005-262259 proposes a two-stage resistance spot welding process for resistance-welding a stacked assembly made up of three or more metal sheets, with a thinnest workpiece disposed on an outermost side of the stacked assembly. The two-stage resistance spot welding process comprises a first stage in which the pressing force on the stacked assembly is reduced and a large electric current is passed through the stacked assembly, and a second stage in which the pressing force is set to a level greater than the pressing force in the first stage, and during which an electric current equal to or smaller than the electric current in the first stage is passed through the stacked assembly for a time longer than the electric current in the first stage.

According to Japanese Laid-Open Patent Publication No. 2005-262259, the disclosed resistance spot welding process is effective to easily produce a spot-welded joint having a nugget of required size, without adding extra process steps and without causing sputtering.

Nevertheless, it has still been desired in the art to increase the bonding strength of a welded joint through a simpler control process than the process disclosed in Japanese Laid-Open Patent Publication No. 2005-262259.

SUMMARY OF THE INVENTION

A general object of the present invention is to provide a resistance welding method, which through a simple control process is capable of sufficiently growing a nugget between a thinnest workpiece on an outermost side of a stacked assembly and a workpiece disposed adjacent to the thinnest workpiece.

A principal object of the present invention is to provide a resistance welding method, which is free of a tendency to cause sputtering.

Another object of the present invention is to provide a resistance welding apparatus, which is capable of carrying out the resistance welding methods described above.

According to an aspect of the present invention, there is provided a method of resistance-welding a stacked assembly made up of at least three workpieces, including a thinnest workpiece of smallest thickness disposed on an outermost side of the stacked assembly, comprising the steps of sandwiching the stacked assembly between a first welding electrode and a second welding electrode such that the first welding electrode is held in abutment against the thinnest workpiece and holding a current branching electrode in abutment against the thinnest workpiece, the current branching electrode being of a polarity opposite to the first welding electrode, and passing an electric current between the first welding electrode and the second welding electrode in order to resistance-weld the stacked assembly, and further passing a branched electric current from the first welding electrode to the current branching electrode or from the current branching electrode to the first welding electrode.

According to the above method, in addition to sandwiching the stacked assembly between the first welding electrode and the second welding electrode, the current branching electrode is held in abutment against the thinnest workpiece while an electric current is passed between the first welding electrode and the second welding electrode. Since the first welding electrode and the current branching electrode, which are held in abutment against the thinnest workpiece, have mutually opposite polarities, a branched electric current flows from the first welding electrode toward the current branching electrode, or from the current branching electrode toward the first welding electrode. When the branched electric current flows through the thinnest workpiece, the interface between the thinnest workpiece and the workpiece adjacent thereto is sufficiently heated.

The interface thus heated by the branched electric current develops a sufficiently large nugget therein, thereby producing a joint of excellent bonding strength across the interface.

The electric current that flows through the remaining workpieces is smaller than in a general resistance welding process, which uses only the first welding electrode and the second welding electrode to sandwich the stacked assembly. Therefore, the workpieces are free of a tendency to cause sputtering, while at the same time the nugget developed across the interface grows sufficiently large in size.

Thus, it is possible to have a sufficiently large nugget grown between the thinnest workpiece on the outermost side of the stacked assembly and the workpiece adjacent to the thinnest workpiece, while at the same time the tendency to cause sputtering can be eliminated.

If a nugget is not formed, or if a nugget is not grown sufficiently in the interface between the remaining workpieces, then only the current branching electrode may be spaced from the thinnest workpiece, or an electric path between the current branching electrode and a power supply may be broken while the electric current passes continuously between the first welding electrode and the second welding electrode. The electric path between the current branching electrode and the power supply may be broken by turning off a switch, which is electrically connected between the current branching electrode and the power supply.

When the current branching electrode is spaced from the thinnest workpiece, or when the electric path between the current branching electrode and the power supply is broken, the branched electric current is eliminated and thus the amount of Joule heat generated in the thinnest workpiece is reduced. As a result, the nugget formed between the thinnest workpiece and the workpiece adjacent thereto is grown at a reduced rate. The electric current that flows through the remaining workpieces increases, thus increasing the amount of Joule heat generated in the remaining workpieces. Consequently, a nugget is formed and is grown sufficiently large in size in the interface between the remaining workpieces.

According to another aspect of the present invention, there also is provided an apparatus for resistance-welding a stacked assembly made up of at least three workpieces, including a thinnest workpiece of smallest thickness disposed on an outermost side of the stacked assembly, comprising a first welding electrode for being held in abutment against the thinnest workpiece, a second welding electrode for sandwiching the stacked assembly in coaction with the first welding electrode, and a current branching electrode for being held in abutment against the thinnest workpiece, the current branching electrode being of a polarity opposite to the first welding electrode. In the apparatus, while an electric current is passed between the first welding electrode and the second welding electrode, which sandwich the stacked assembly therebetween to resistance-weld the stacked assembly, a branched electric current is passed from the first welding electrode to the current branching electrode or from the current branching electrode to the first welding electrode.

When the apparatus resistance-welds the stacked assembly, a branched electric current for sufficiently heating the interface between the thinnest workpiece and the workpiece adjacent thereto flows through the thinnest workpiece from the first welding electrode to the current branching electrode, or from the current branching electrode to the first welding electrode. As a result, in the interface, a nugget is grown sufficiently large in size.

In order to generate the branched electric current, the apparatus is required to include additionally only the current branching electrode and a displacing mechanism for displacing the current branching electrode. Therefore, the apparatus is not rendered unduly complex in structure due to the addition of the current branching electrode and the displacing mechanism. The process of controlling the apparatus also is relatively simple.

The current branching electrode may be displaced in unison with the first welding electrode toward and away from the thinnest workpiece by a mechanism, which is used to displace the first welding electrode. However, it is more preferable that the displacing mechanism be provided only for displacing the current branching electrode toward and away from the thinnest workpiece, so that heating of the interface between the thinnest workpiece and the workpiece adjacent thereto, and heating of the interface between the remaining workpieces, can be controlled individually.

Alternatively, a switch may be electrically connected between the current branching electrode and a power supply for connecting or breaking an electric path between the current branching electrode and the power supply. The switch may be shifted from a turned-on state to a turned-off state, or vice versa, in order to individually control heating of the interface between the thinnest workpiece and the workpiece adjacent thereto, and heating of the interface between the remaining workpieces.

The current branching electrode should preferably have an annular shape, and is disposed in surrounding relation to the first welding electrode. An annular current branching electrode allows the branched electric current to flow uniformly through the thinnest workpiece. Therefore, the interface between the thinnest workpiece and the workpiece adjacent thereto is uniformly heated in order to facilitate formation and growth of the nugget to a sufficiently large size.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

A resistance welding method will be described in detail below with reference to the accompanying drawings, in connection with a resistance welding apparatus, which carries out the resistance welding method according to an embodiment of the present invention.

Figure 1:
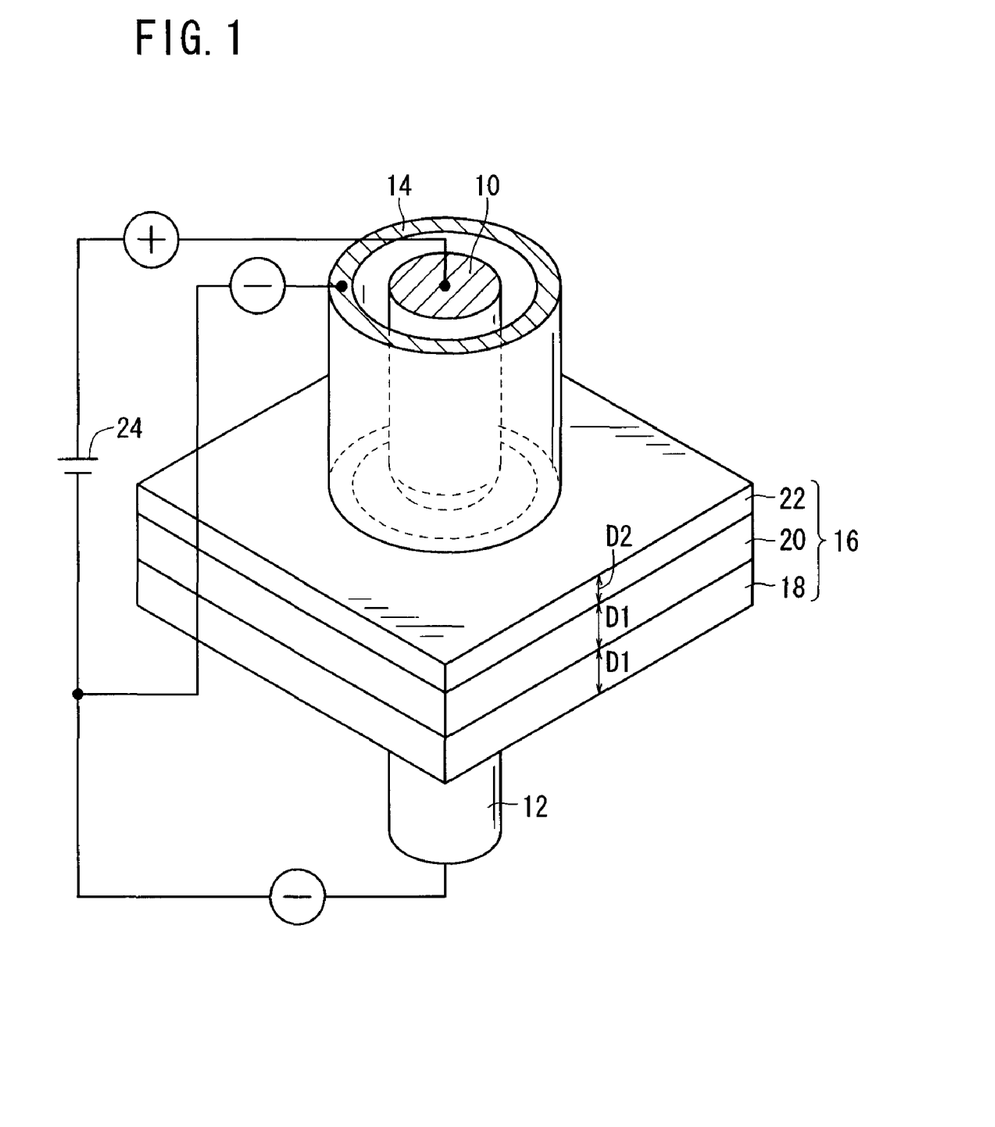
FIG. 1 is a perspective view, partially in transverse cross-section, showing a resistance welding apparatus according to an embodiment of the present invention.

FIG. 1 is a perspective view, partially in transverse cross-section, of a resistance welding apparatus according to an embodiment of the present invention. As shown in FIG. 1, the resistance welding apparatus comprises a welding gun, not shown, having a first electrode tip 10 serving as a first welding electrode, a second electrode tip 12 serving as a second welding electrode, and a current branching electrode 14. The welding gun is mounted on a tip end of an arm of an articulated robot, such as a six-axis robot or the like. Such an articulated robot, with a welding gun mounted on the arm thereof, is well known in the art and will not be described in detail below.

The resistance welding apparatus serves to weld a stacked assembly 16. The stacked assembly 16 comprises three metal sheets 18, 20, 22 defining workpieces that are stacked successively from below in this order. The metal sheets 18 and 20 each have a thickness D1 (e.g., about 1 mm through 2 mm), whereas the metal sheet 22 has a thickness D2 (e.g., about 0.5 mm through 0.7 mm), which is smaller than the thickness D1. In other words, the metal sheets 18 and 20 are identical in thickness to each other, while the metal sheet 22 is thinner than the metal sheets 18 and 20. Hereinbelow, the metal sheet 22 will also be referred to as a "thinnest workpiece".

The metal sheets 18, 20 each comprise, for example, a high-tensile steel such as JAC590, JAC780 or JAC980 (which are high-performance high-tensile steel sheets defined according to the Japan Iron and Steel Federation Standard). The thinnest workpiece 22 comprises, for example, a mild steel such as JAC270 (which is a high-performance steel sheet for press-forming defined according to the Japan Iron and Steel Federation Standard). The metal sheets 18, 20 may comprise the same metal or different metals.

Alternatively, all the metal sheets 18, 20, 22 may comprise mild steels. Also, the metal sheet 18 may comprise a high-tensile steel, while the metal sheets 20, 22 may comprise mild steels.

Materials for the metal sheets 18, 20, 22 are not limited to the above-mentioned steel materials, and may be any materials that are capable of being resistance-welded.

The first electrode tip 10 and the second electrode tip 12, each of which is in the form of an elongate rod, sandwich the stacked assembly 16 therebetween, and pass an electric current through the stacked assembly 16. In the present invention, an electric current flows through the stacked assembly 16 from the first electrode tip 10 to the second electrode tip 12.

If the welding gun is of a so-called X-type, the first electrode tip 10 is mounted on one of a pair of openable and closable chucks, while the second electrode tip 12 is mounted on the other chuck. When the chucks are moved toward or away from each other, the first electrode tip 10 and the second electrode tip 12 move toward or away from each other.

Alternatively, if the welding gun is of a so-called C-type, then the second electrode tip 12 is mounted on the tip end of a fixed arm, while the first electrode tip 10 is connected to a ball screw. When the ball screw rotates about its own axis, the first electrode tip 10 moves toward or away from the second electrode tip 12.

The current branching electrode 14 has an annular shape and is disposed in surrounding relation to the first electrode tip 10. The welding gun, which supports the first electrode tip 10 thereon, includes a displacing mechanism, such as a ball screw, a fluid cylinder, or the like, for displacing the current branching electrode 14 toward and away from the stacked assembly 16. The displacing mechanism is capable of moving the current branching electrode 14 toward and away from the stacked assembly 16 independently of the first electrode tip 10.

In the present embodiment, the first electrode tip 10 is electrically connected to the positive terminal of a DC power supply 24, whereas the second electrode tip 12 and the current branching electrode 14 are electrically connected to the negative terminal of the DC power supply 24. Although the first electrode tip 10 and the current branching electrode 14 both contact the thinnest workpiece 22 of the stacked assembly 16, the first electrode tip 10 and the current branching electrode 14 have mutually opposite polarities. That is, the first electrode tip 10 and the current branching electrode 14 are electrically connected, respectively, to opposite polarities of the DC power supply 24.

In the above structure, when the distance Z between the first electrode tip 10 and the current branching electrode 14 is excessively large, the resistance between the first electrode tip 10 and the current branching electrode 14 is large. Accordingly, it is difficult for a branched electric current i2 described below (see FIG. 3) to flow between the first electrode tip 10 and the current branching electrode 14. Thus, the distance Z is determined such that the resistance between the first electrode tip 10 and the current branching electrode 14 enables the branched electric current i2 to flow at an appropriate current value.

The resistance welding apparatus according to the present embodiment is basically constructed as described above. Operations and advantages of the resistance welding apparatus will be described below in relation to the resistance welding method according to the present embodiment.

For resistance-welding the stacked assembly 16, or stated otherwise, for joining the metal sheets 18 and 20 to each other as well as joining the metal sheets 20 and 22 to each other, the robot moves the welding gun in order to position the stacked assembly 16 between the first electrode tip 10 and the second electrode tip 12. Thereafter, the chucks are moved toward each other, or the ball screw is rotated about its own axis in order to move the first electrode tip 10 and the second electrode tip 12 relatively toward each other, thereby sandwiching the stacked assembly 16 between the first electrode tip 10 and the second electrode tip 12.

Figure 2:
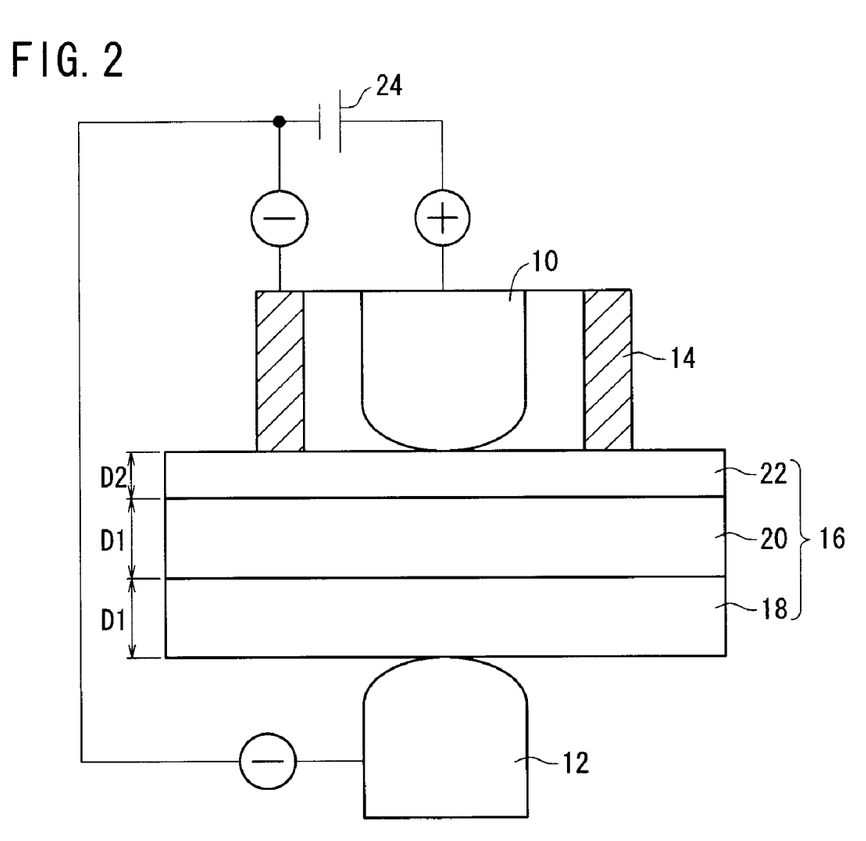
FIG. 2 is a vertical cross-sectional view showing the manner in which a stacked assembly, which is to be welded, is sandwiched by a first electrode tip, a second electrode tip, and a current branching electrode.

At the same time, or subsequently thereafter, the displacing mechanism brings the current branching electrode 14 into abutment against the thinnest workpiece 22 of the stacked assembly 16, as shown in FIG. 2.

At this time, the current branching electrode 14 may be held in contact with the thinnest workpiece 22, or may be pressed against the thinnest workpiece 22 under a given pressing force.

Figure 3:
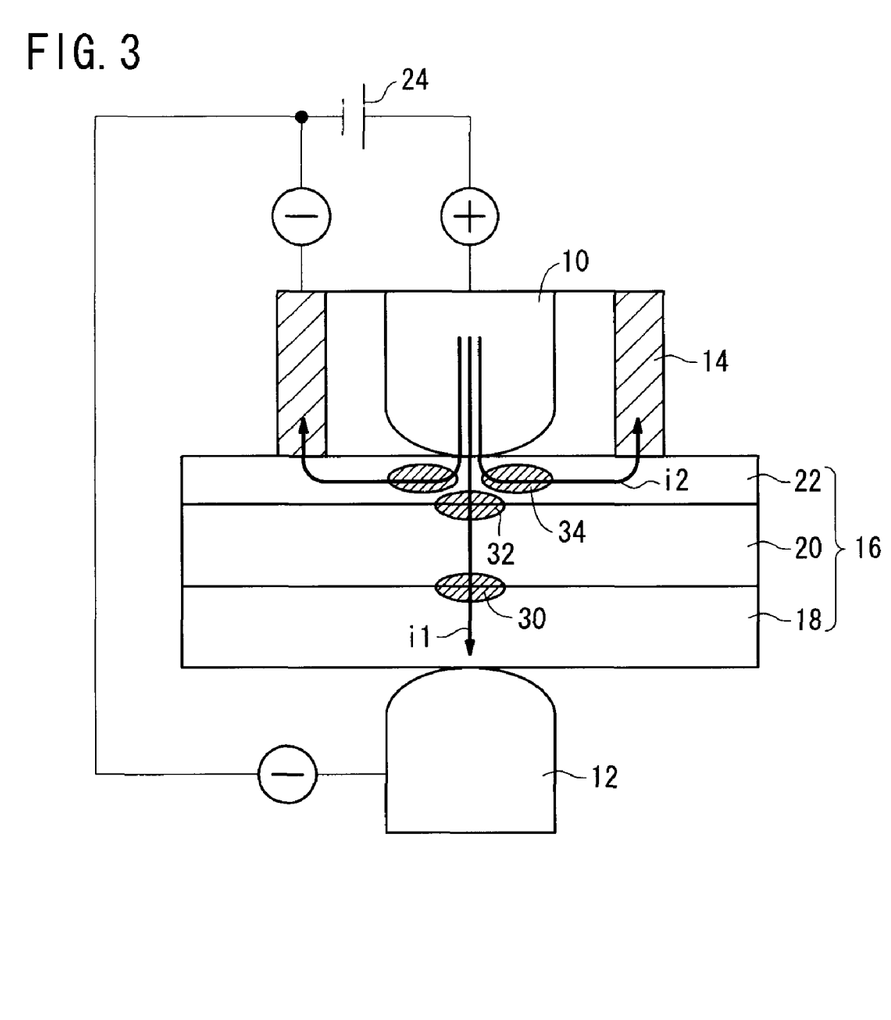
FIG. 3 is a vertical cross-sectional view showing the manner in which the resistance welding apparatus initiates a resistance welding process by passing an electric current, which flows from the first electrode tip to the second electrode tip through the stacked assembly.

Then, the DC power supply 24 is turned on to supply electric current to the stacked assembly 16. Since the first electrode tip 10 and the second electrode tip 12 are electrically connected respectively to positive and negative terminals of the DC power supply 24, an electric current i1 flows from the first electrode tip 10 to the second electrode tip 12 through the stacked assembly 16, as shown in FIG. 3. The interface between the metal sheets 18 and 20, as well as the interface between the metal sheets 20 and 22, are now heated by Joule heat generated by the electric current i1, thereby producing respective heated regions 30, 32. The heated region 30 extends into the metal sheets 18, 20, whereas the heated region 32 extends into the metal sheets 20, 22.

The current branching electrode 14, which is held in abutment against the thinnest workpiece 22, is electrically connected to the negative terminal of the DC power supply 24. Therefore, at the same time that the electric current i1 flows from the first electrode tip 10, the branched electric current i2 also flows from the first electrode tip 10 toward the current branching electrode 14. Because the current branching electrode 14 is annular in shape, the branched electric current i2 flows radially outward from the first electrode tip 10 toward the current branching electrode 14.

In the present embodiment, the branched electric current i2 flows only through the thinnest workpiece 22, but not through the metal sheets 18, 20. As a result, the electric current passing through the thinnest workpiece 22 is of a value greater than that of a general resistance welding process, which uses only the first electrode tip 10 and the second electrode tip 12 for sandwiching the stacked assembly 16.

Figure 4:
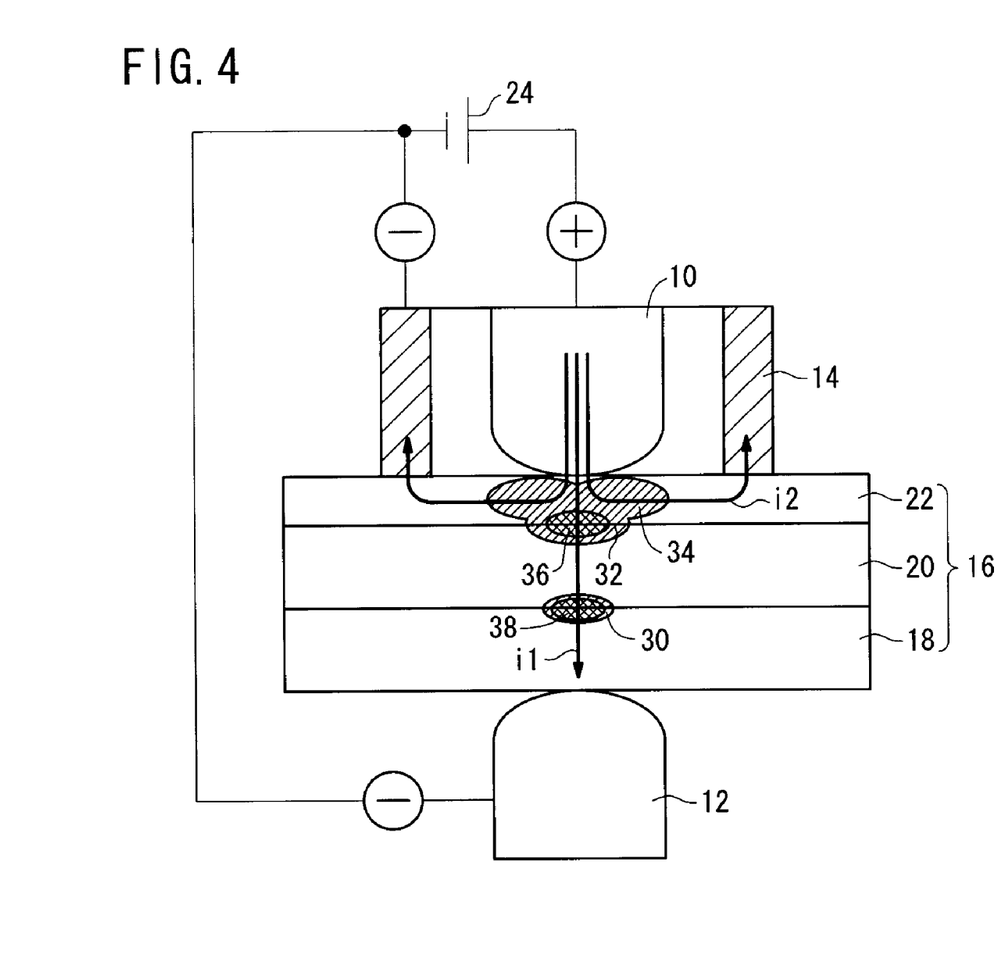
FIG. 4 is a vertical cross-sectional view showing the manner in which the resistance welding apparatus continuously passes the electric current after having initiated passage of the electric current as shown in FIG. 3.

Consequently, the thinnest workpiece 22 develops other heated regions 34 therein, in addition to the heated region 32. Further, since the branched electric current i2 flows in a radial pattern, the heated region 34 heats the interface between the metal sheets 20, 22 in a corresponding radial pattern. Over time, the heated region 34 spreads and becomes larger in size, and unites with the heated region 32, as shown in FIG. 4.

Due to heat that is transferred from the united heated regions 32, 34, the interface between the metal sheets 20, 22 rises sufficiently in temperature and begins to melt. As a result, a nugget 36 is formed between the metal sheets 20 and 22.

In this case, as the proportion of the branched electric current i2 becomes larger, the heated region 34 can become lager. However, if the proportion of the branched electric current i2 becomes excessively large, the electric current i1 becomes smaller, and the heated regions 30, 32 accordingly become smaller. Thus, the size of the nugget 36 becomes saturated, while the size of the nugget 38 becomes smaller. Therefore, the proportion of the branched electric current i2 is preferably determined such that the electric current i1 is large enough for the nugget 38 to grow sufficiently.

Incidentally, the proportion of the branched electric current i2 to the electric current i1 can be adjusted, for example, by changing the distance Z (see FIGS. 1 and 2) between the first electrode tip 10 and the current branching electrode 14 as mentioned above.

As long as electric current continues to flow through the stacked assembly 16 between the first electrode tip 10 and the second electrode tip 12, the nugget 36 grows over time. Accordingly, the nugget 36 can be grown sufficiently by continuously passing electric current through the stacked assembly 16 between the first electrode tip 10 and the second electrode tip 12. The rate at which the nugget 36 grows with respect to time, and during which electric current passes through the stacked assembly 16 between the first electrode tip 10 and the second electrode tip 12, may be confirmed in advance by means of a resistance welding test conducted on test pieces.

The electric current i1 that flows through the metal sheets 18, 20 is of a value smaller than in a general resistance welding process. Accordingly, the amount of heat applied to the metal sheets 18, 20 does not become excessively large, while the nugget 36 between the metal sheets 20, 22 continues to grow. Therefore, the metal sheets 18, 20 are free of the tendency to cause sputtering.

A nugget 38 also is formed by the electric current i1 between the metal sheets 18, 20. When the branched electric current i2 continues to flow, the total electrical energy of the electric current i1 is smaller in comparison with the case where flow of the branched electric current i2 is stopped. Accordingly, the heated region 30 and thus the nugget 38 tend to become slightly small.

Figure 5:
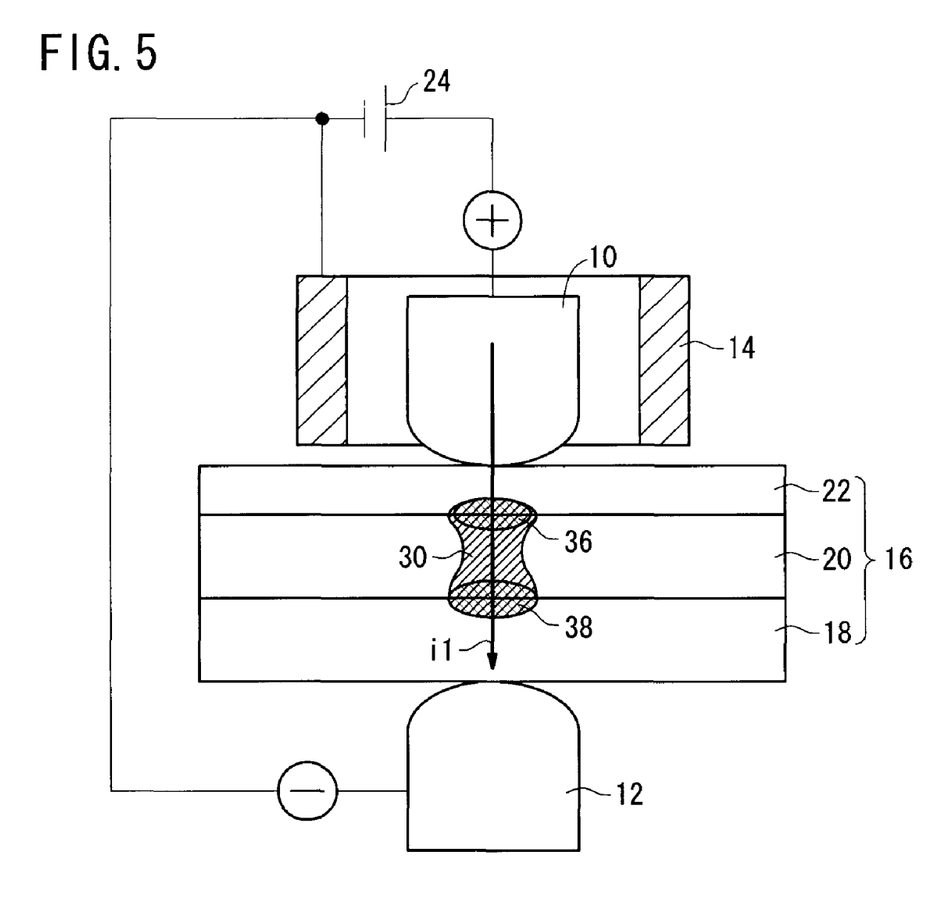
FIG. 5 is a vertical cross-sectional view showing the manner in which the current branching electrode is lifted from the stacked assembly while the resistance welding apparatus continues to pass the electric current through the stacked assembly from the first electrode tip to the second electrode tip.

Thus, for further promoting growth of the nugget 38, it is preferred that the current branching electrode 14 is lifted away from the thinnest workpiece 22, while electric current is continuously supplied from the first electrode tip 10 to the second electrode tip 12, as shown in FIG. 5. At this time, since the current branching electrode 14 no longer is in contact with the thinnest workpiece 22, the electric current i1 that flows from the first electrode tip 10 to the second electrode tip 12 becomes greater in magnitude, and thus, the total electrical energy of the electric current i1 until the end of application of the electric current is increased.

When the branched electric current i2 disappears, only the electric current i1 directed from the first electrode tip 10 to the second electrode tip 12 remains and flows through the thinnest workpiece 22. As a consequence, the heated region 34 within the metal sheets 20, 22 (see FIG. 4) disappears, as shown in FIG. 5.

At this time, the metal sheets 18, 20 behave in the same way as in a normal resistance welding process. More specifically, since the increased electric current i1 flows from the first electrode tip 10 to the second electrode tip 12, an increased amount of Joule heat is generated within the metal sheets 18, 20, thereby causing the heated region 30 to spread and increase both in size and temperature. The interface between the metal sheets 18, 20 is heated by the heated region 30, which is increased in temperature. The interface between the metal sheets 18, 20 and neighboring regions thereof also rise in temperature sufficiently so as to become further melted, thereby promoting growth of the nugget 38.

In order for the nugget 38 to grow sufficiently, the electric current i1 is continuously passed through the stacked assembly 16 from the first electrode tip 10 to the second electrode tip 12, until the nugget 38 becomes united with the nugget 36 between the metal sheets 20, 22. The rate at which the nugget 38 grows with respect to time, and during which electric current passes through the stacked assembly 16 between the first electrode tip 10 and the second electrode tip 12, may be confirmed in advance by means of a resistance welding test conducted on test pieces.

The interface between the metal sheets 18, 20 is heated in advance by the heated region 30, which is formed by the electric current i1 that passes for purposes of forming the nugget 36 between the metal sheets 20, 22. Therefore, the metal sheets 18, 20 become blended sufficiently with each other prior to the nugget 38 beginning to grow. Therefore, the metal sheets 18, 20 are not liable to cause sputtering.

According to the present embodiment, as described above, the metal sheets 18, 20, 22 are prevented from causing sputtering while the nugget 36 between the metal sheets 20, 22, and also the nugget 38 between the metal sheets 18, 20, are grown.

Figure 6:
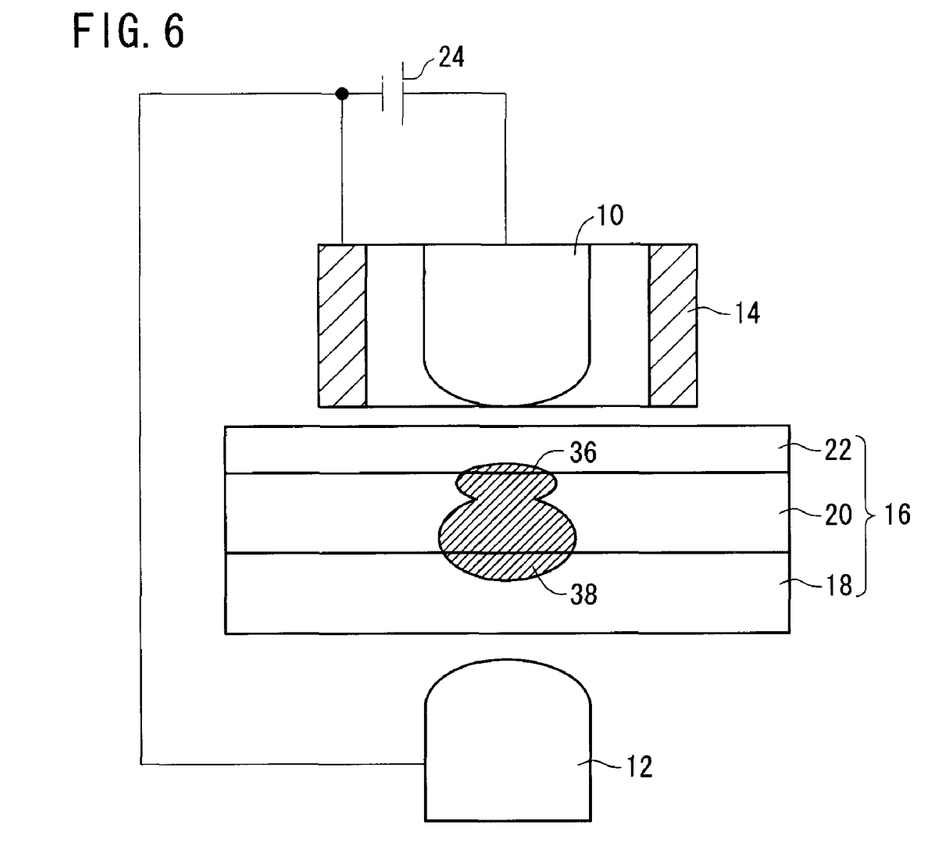
FIG. 6 is a vertical cross-sectional view showing the manner in which the first electrode tip also is lifted from the stacked assembly, thereby finishing the resistance welding process by passage of the electric current.

When the nugget 38 has grown sufficiently after elapse of a predetermined period of time, the DC power supply 24 is turned off so that the electric current is stopped from passing through the stacked assembly 16 between the first electrode tip 10 and the second electrode tip 12. Then, the first electrode tip 10 is lifted away from the thinnest workpiece 22, as shown in FIG. 6. Alternatively, rather than turning off the DC power supply 24, the first electrode tip 10 may simply be lifted off from the thinnest workpiece 22. Thus, the first electrode tip 10 becomes electrically isolated from the second electrode tip 12, thereby stopping the flow of electric current through the stacked assembly 16 between the first electrode tip 10 and the second electrode tip 12.

The above operation, from the start to the end of the resistance welding process, is carried out under the control of a control circuit, not shown.

When the electric current is stopped, heating of the metal sheets 18, 20, 22 also is stopped. The nugget 38 becomes cooled and solidified over time, thereby firmly joining the metal sheets 18, 20 to each other. Similarly, the nugget 36 becomes cooled and solidified over time, thereby firmly joining the metal sheets 20, 22 to each other.

The metal sheets 18, 20, 22 thus are welded together to produce a desired welded product.

As a result of the sufficiently grown nugget 38, the welded product exhibits excellent bonding strength between the metal sheets 18, 20. The welded product also exhibits excellent bonding strength between the metal sheets 20, 22 as a result of the branched electric current i2 that flows through the thinnest workpiece 22, thereby producing the nugget 36, which is grown sufficiently between the metal sheets 20, 22.

As can be understood from the above description, the resistance welding apparatus according to the present embodiment basically is constructed by adding the current branching electrode 14, together with the displacing mechanism for displacing the current branching electrode 14, to an existing resistance welding apparatus. By the addition of the current branching electrode 14 and the displacing mechanism, the resistance welding apparatus is not rendered unduly complex in structure.

In the above illustrated embodiment, the current branching electrode 14 becomes spaced from the thinnest workpiece 22 in advance of the first electrode tip 10 becoming spaced from the thinnest workpiece 22. However, depending on values of the electric current i1 and the branched electric current i2, the branching electrode 14 and the first electrode tip 10 may simultaneously be spaced from the thinnest workpiece 22.

The stacked assembly 16, which is resistance-welded by the resistance welding apparatus according to the present embodiment, may comprise four or more stacked metal sheets.

Figure 7:
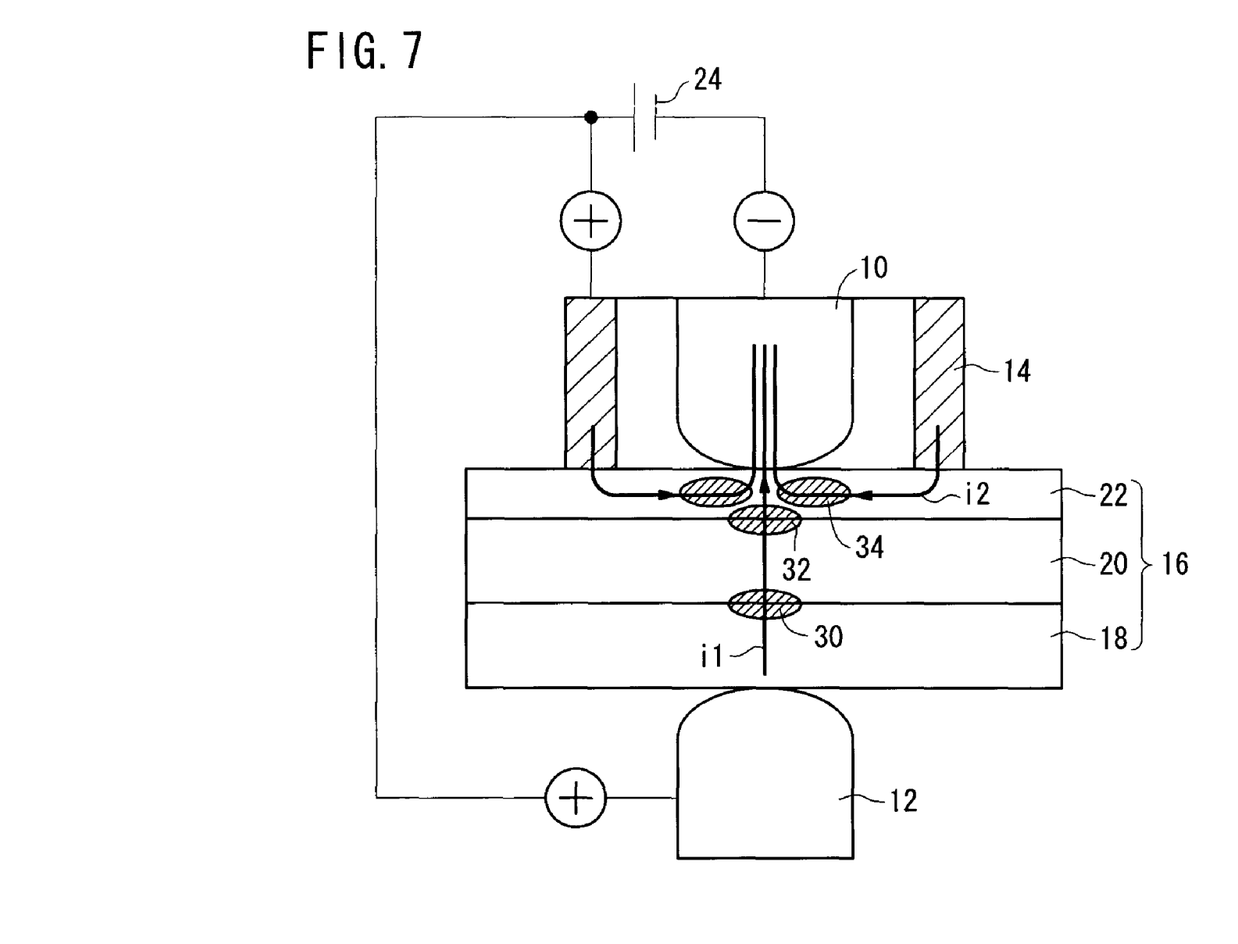
FIG. 7 is a vertical cross-sectional view of a modified resistance welding apparatus, showing the manner in which electric currents flow from the second electrode tip and the current branching electrode to the first electrode tip.

Furthermore, FIG. 7 shows a modified resistance welding apparatus, in which electric current flows from the second electrode tip 12, which is held in abutment against the metal sheet 18, to the first electrode tip 10, which is held in abutment against the thinnest workpiece 22. The current branching electrode 14 that is held in abutment against the thinnest workpiece 22 has a polarity which is opposite to the polarity of the first electrode tip 10. More specifically, the second electrode tip 12 and the current branching electrode 14 are electrically connected to the positive terminal of the DC power supply 24, whereas the first electrode tip 10 is electrically connected to the negative terminal of the DC power supply 24. As a result of the electric connections shown in FIG. 7, an electric current i1 flows from the second electrode tip 12 to the first electrode tip 10, and a branched electric current i2 flows from the current branching electrode 14 to the first electrode tip 10.

Instead of spacing the current branching electrode 14 away from the thinnest workpiece 22, a switch may be electrically connected between the thinnest workpiece 22 and the DC power supply 24. The switch may be turned off to stop electric current from flowing from the first electrode tip 10 to the current branching electrode 14, in the embodiment shown in FIGS. 1 through 6, or to stop electric current from flowing from the current branching electrode 14 to the first electrode tip 10, in the modification shown in FIG. 7. The switch may be turned on to form the heated region 34.

If the above switch is electrically connected between the thinnest workpiece 22 and the DC power supply 24, then the displacing mechanism, which displaces the current branching electrode 14 toward and away from the stacked assembly 16 independently of the first electrode tip 10, may be dispensed with. Therefore, the resistance welding apparatus is made simpler in structure, and the process of controlling the resistance welding apparatus also is simplified.

In either the above embodiment or the modifications thereof, the current branching electrode 14 is not necessarily limited to an annular shape. The current branching electrode 14 may alternatively be in the form of an elongate rod, similar to the first electrode tip 10 and the second electrode tip 12. The resistance welding apparatus may include a plurality of current branching electrodes 14 each in the form of an elongate rod, which simultaneously are brought into or out of contact with the thinnest workpiece 22.

Figure 8:
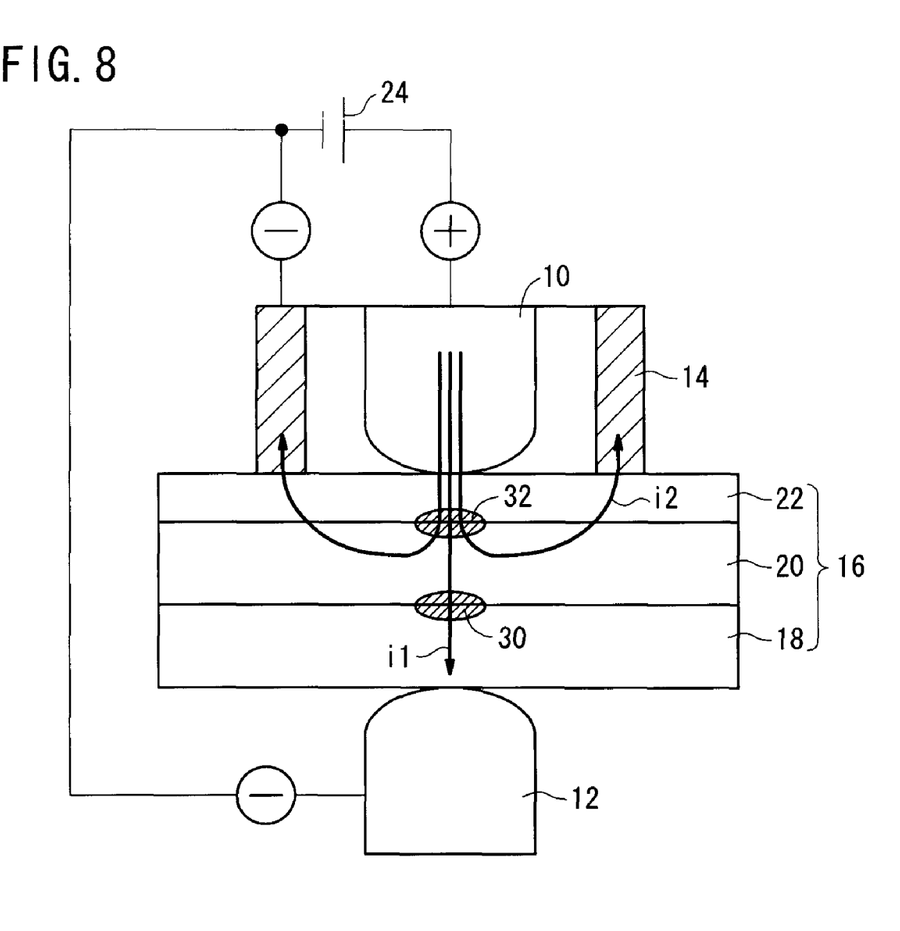
FIG. 8 is a vertical cross-sectional view showing the manner in which electric currents flow from the first electrode tip to the current branching electrode through the uppermost workpiece and the workpiece directly below the uppermost workpiece in a stacked assembly.

Further, as shown in FIG. 8, in the above embodiments, the branched electric current i2 may flow not only through the thinnest workpiece 22, which contacts with the first electrode tip 10, but also through the metal sheet 20, which is situated directly below the thinnest workpiece 22.

In this case, resistance heat is generated between the thinnest workpiece 22 and the metal sheet 20, and a nugget 36 is then formed. On the other hand, no electric current flows between the metal sheets 18, 20 from the first electrode tip 10 to the current branching electrode 14 or only tiny electric current flows even if it flows. Thus, the nugget 36 formed between the thinnest workpiece 22 and the metal sheet 20 grows easily.

Although certain preferred embodiments of the present invention have been shown and described in detail, it should be understood that various changes and modifications may be made to the embodiments without departing from the scope of the invention as set forth in the appended claims.

What is claimed is:

1. A method of resistance-welding a stacked assembly made up of at least three workpieces, including a thinnest workpiece of smallest thickness disposed on an outermost side of the stacked assembly, comprising the steps of:
    sandwiching the stacked assembly between a first welding electrode and a second welding electrode such that the first welding electrode is held in abutment against the thinnest workpiece, and holding a current branching electrode in abutment against the thinnest workpiece, the current branching electrode being of a polarity opposite to the first welding electrode; and
    passing an electric current between the first welding electrode and the second welding electrode in order to resistance-weld the stacked assembly, and passing a branched electric current from the first welding electrode to the current branching electrode or from the current branching electrode to the first welding electrode.

2. A method according to claim 1, wherein the branched electric current flows only through the thinnest workpiece.

3. A method according to claim 1, wherein the branched electric current flows through the thinnest workpiece and the workpiece just below the thinnest workpiece.

4. A method according to claim 1, further comprising the step of:

spacing only the current branching electrode from the thinnest workpiece in order to stop the branched electric current from flowing, while the electric current is passed between the first welding electrode and the second welding electrode.

5. A method according to claim 1, further comprising the step of:

breaking an electric path between the current branching electrode and a power supply in order to stop the branched electric current from flowing, while the electric current is passed between the first welding electrode and the second welding electrode.

6. An apparatus for resistance-welding a stacked assembly made up of at least three workpieces, including a thinnest workpiece of smallest thickness disposed on an outermost side of the stacked assembly, comprising:

a first welding electrode for being held in abutment against the thinnest workpiece;

a second welding electrode for sandwiching the stacked assembly in coaction with the first welding electrode; and a current branching electrode for being held in abutment against the thinnest workpiece, the current branching electrode being of a polarity opposite to the first welding electrode, wherein, while an electric current is passed between the first welding electrode and the second welding electrode, which sandwich the stacked assembly therebetween in order to resistance-weld the stacked assembly, a branched electric current is passed from the first welding electrode to the current branching electrode or from the current branching electrode to the first welding electrode.

7. An apparatus according to claim 6, wherein the branched electric current flows only through the thinnest workpiece.

8. An apparatus according to claim 6, wherein the branched electric current flows through the thinnest workpiece and the workpiece just below the thinnest workpiece.

9. An apparatus according to claim 6, wherein the current branching electrode has an annular shape and is disposed in surrounding relation to the first welding electrode.

* * * * *